(12) United States Patent
Stewart et al.

(10) Patent No.: US 7,603,185 B2
(45) Date of Patent: Oct. 13, 2009

(54) SYSTEM FOR GAIN SCHEDULING CONTROL

(75) Inventors: Gregory E. Stewart, North Vancouver (CA); Francesco Borrelli, Frattamaggiore (IT)

(73) Assignee: Honeywell International Inc., Morristown, NJ (US)

( * ) Notice: Subject to any disclaimer, the term of this patent is extended or adjusted under 35 U.S.C. 154(b) by 317 days.

(21) Appl. No.: 11/532,081

(22) Filed: Sep. 14, 2006

(65) Prior Publication Data

US 2008/0125875 A1    May 29, 2008

(51) Int. Cl.
*G06F 19/00* (2006.01)
(52) U.S. Cl. .......................... 700/32; 340/2.4
(58) Field of Classification Search ............... 700/2, 700/12, 13–16, 21, 23, 45, 50, 29, 30–31, 700/20, 32; 706/15, 16, 45; 340/2.4
See application file for complete search history.

(56) References Cited

U.S. PATENT DOCUMENTS

| | | | |
|---|---|---|---|
| 5,748,467 A * | 5/1998 | Qin et al. .................... | 700/50 |
| 6,336,322 B1 | 1/2002 | Kuwabara et al. | |
| 6,992,542 B2 | 1/2006 | Tsai | |
| 7,330,804 B2 * | 2/2008 | Turner et al. .................. | 703/2 |
| 2004/0225383 A1 | 11/2004 | Tsai et al. | |
| 2007/0142932 A1 | 6/2007 | Stewart | |

OTHER PUBLICATIONS

Zhou et al., Adaptive Switch Control Method and its Application to Tracking Control of a Robot, 1996, IEEE, p. 214-219.*
Clement et al., "Flexible Arm Multiobjective Control Via Voula Parameterization and LMI Optimization," 3rd IFAC Rocond-Prague, pp. 1-6, Jun. 2000.
Rugh et al., "Research on gain scheduling," Automatica, 36, pp. 1401-1425, 2000.
Gray G J et al: The Application of Genetic Algorithms to Gain-Scheduling Controller Analysis and Design, Genetic Algorithms in Eng. Syst.,IEEE, UK, Sep. 1997, pp. 364-368.
Zhenfu Bi et al: An Approach of PI Gain Scheduling with Hysteresis Switching for the Control of Boiler Drum . . . , IEEE, Oct. 2006, pp. 1517-1521.
Jared Kresge: Gain Scheduled Controller Design Effectiveness on a Non-Minimum Phase . . . [Online] May 2005, URL:http://oak.cats.ohiou.edu....

(Continued)

*Primary Examiner*—Kidest Bahta
(74) *Attorney, Agent, or Firm*—Crompton Seager Tufte, LLC

(57) ABSTRACT

A system for controlling nonlinear plants which may be effected with gain scheduled feedback controllers. Several linear sub-controllers having various gains may be put together as one unit. The overall controller may be changed by switching from one sub-controller to another according to an exogenous or endogenous parameter. The signal to the switch may reflect operational ranges of the plant occurring at certain times and indicate the gain desired from the system relative to the output and input signals of the plant at those times. The advantages of the present approach may include a guarantee of nominal and robust stability both global and local, a permitting of the use of control structures that are familiar to industrial practitioners, and no requirement of advanced mathematical techniques for its implementation.

8 Claims, 5 Drawing Sheets

OTHER PUBLICATIONS

Graebe et al., "Dynamic Transfer Among Alternative Controllers and Its Relation to Antiwindup Controller Design," IEEE Transactions on Control Systems Technology, vol. 4, No. 1, pp. 92-99, Jan. 1996.

Liberzon et al., "Basic Problems in Stability and Design of Switched Systems," IEEE Control Systems, Lecture Notes, pp. 59-70, Oct. 1999.

* cited by examiner

SYSTEM FOR GAIN SCHEDULING CONTROL

BACKGROUND

This invention pertains to controllers and particularly to feedback controllers. More particularly, the invention pertains to state and output feedback controllers.

A technical or commercial need that the present invention may solve is as follows. Gain scheduled controllers may be a way of designing a controller for a nonlinear plant. Several linear controllers may be put together and a gain scheduled controller may be implemented by switching from one linear controller to another depending on an exogenous or endogenous scheduling variable. The present system may be a technique for switching between the controllers in such a way that certain closed-loop performance properties are improved over the related art.

U.S. patent application Ser. No. 11/444,850, filed Dec. 15, 2005, is hereby incorporated by reference.

SUMMARY

The invention is a gain scheduled feedback controller having a number of controllers and a switch with a terminal connectable to an output of nearly any of the controllers. Each controller may have a gain. At least two gains of the controller should not be the same. The switch may have an input for selectively connecting the terminal to an output of one of the controllers. A signal from the switch terminal may be for indicating a controller selection according to an operating range of the plant. an input to the controllers may be for a receiving a measured parameter from plant. A terminal of the switch may be for providing a signal to an actuator of the plant. A property of a signal to an actuator from an output of the switch terminal may depend in part on a measured parameter and an operating rang of the plant.

DESCRIPTION

The present system may be a technique for switching between the controllers in such a way that certain closed loop performance properties can be improved.

If the designed linear controllers are of "state feedback" structure, then the present system may implement the state observer component of each controller in parallel at all times. This may result in the estimated state of any one sub-controller being closer to its "correct state" rather than inducing undesirable transient effects due to initializing the state observer. By running each of the state observers in parallel the effect of start up transients is mitigated.

If the linear controllers are of the "output feedback form", then the present system may utilize factoring each of the controllers into their components—an internal model and a stable Youla parameter. The linear model may be appropriate for the operating point for which the linear controller was designed. Then, these controllers may be implemented as a parallel bank of internal models and a parallel bank of Youla parameters. The switching may be configured for assured closed-loop stability.

The present system may be used in a gain scheduling control of nonlinear plants. A design approach may use a standard gain scheduling control design procedure which could follow four main steps. The steps may include: 1) Computing a linear parameter varying (LPV) model of the plant; 2) Using linear techniques to design linear sub-controllers for linearized models of the plant which are different for various values of the scheduling parameter $\sigma(t)$; 3) Implementing the family of linear controllers such that the overall controller is varied according to the value of the scheduling variable $\theta(t)$; and 4) Assessing stability and performance in terms of local and global properties via analytical and simulation methods, respectively. Step 3 may be regarded as being significant herein.

The present system may be a technique for effecting step 3 (controller gain variation) such that several of the performance properties commonly evaluated in step 4 are being addressed. This system may be implemented in two kinds of controllers, "state feedback" and "output feedback", which may result from the linear design in step 2. For state feedback controllers, the present system may lead to reduced transient effects induced by the switching between linear sub-controllers. For output feedback controllers, the present system may provide a gain scheduled controller that may be proven to have desirable closed-loop stability properties.

Figure 1:
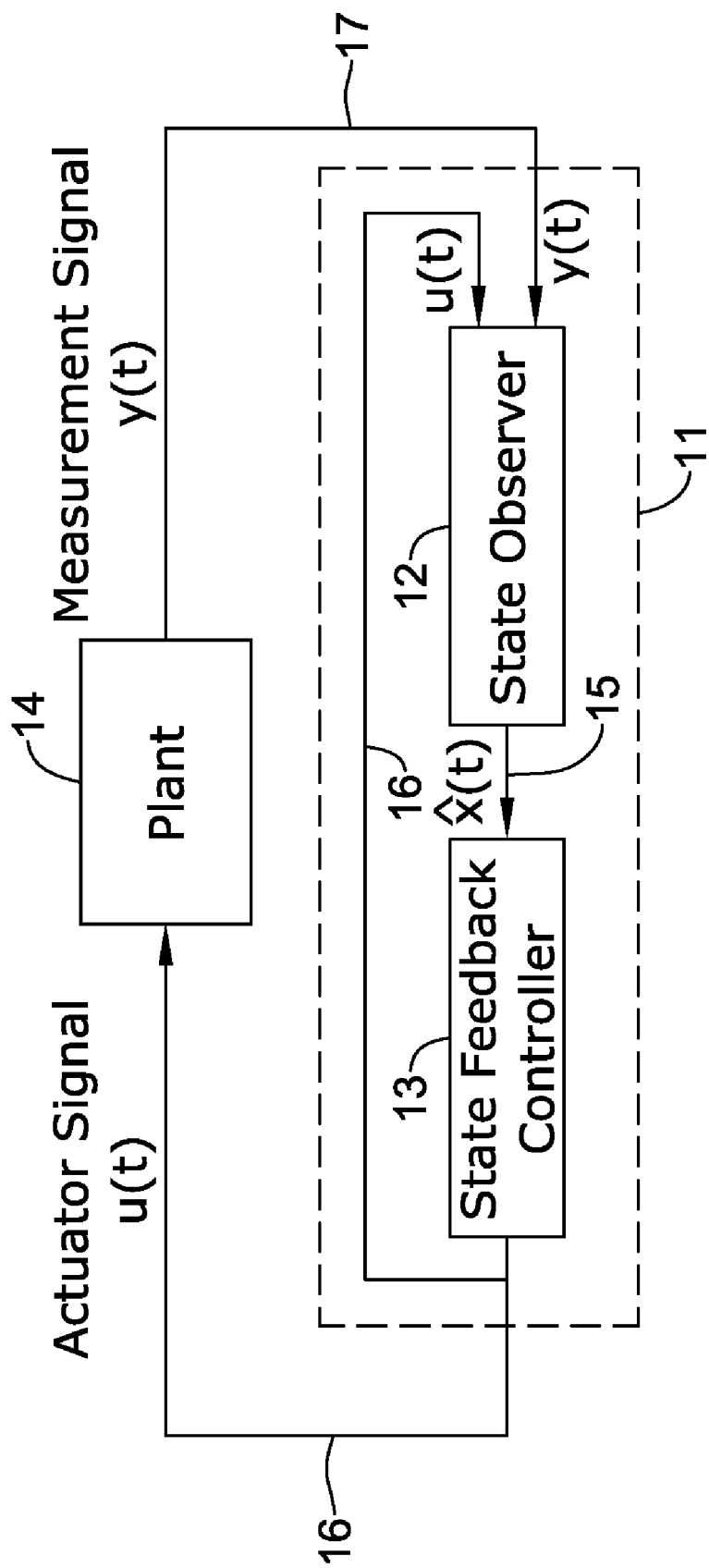
FIG. 1 shows a state feedback controller.

In FIG. 1, a linear state feedback control system 11 may consist of two components, a state observer 12 and a state feedback controller 13. A dynamic state observer 12 may provide an estimate $\hat{x}(t)$ 15 of the internal state of a plant 14 from a measurement signal $y(t)$ 17. The state feedback controller 13 may generate an actuator signal $u(t)$ 16 as a function of the estimated state $\hat{x}(t)$ 15. The creation of actuator signal $u(t)$ 16 may involve a simple matrix multiplication function such as $u(t)=F\cdot\hat{x}(t)$ or an affine function $u(t)=F\cdot\hat{x}(t)+g$. The actuator signal 16 may be fed back to the state observer 12.

Figure 2A:
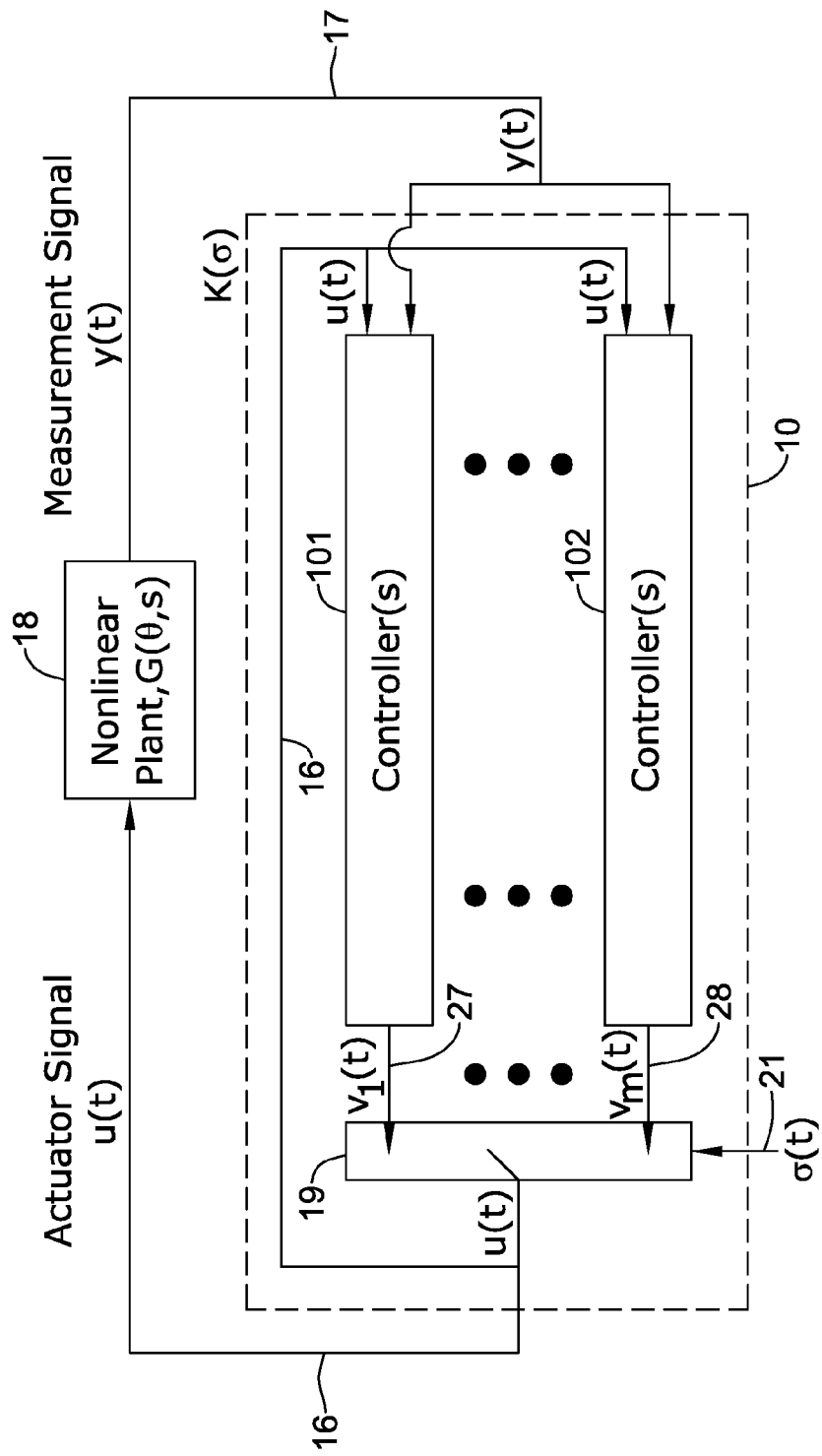
FIGS. 2a and 2b show a gain scheduled state feedback controller.

In a configuration shown in a diagram of FIG. 2a, gain scheduling may be defined as switching between numerous linear controllers 101, 102, where each one is designed (e.g., with a different order and/or value for its coefficients) for a specific operating point of a nonlinear plant G 18 as may be defined by a certain static value or neighborhood of a static value of $\theta$. A position of controller switch 19 may be determined by the switching signal 21, $\sigma(t) \in \{1, \ldots m\}$, which specifies which one of the m controllers 101, 102 is online at any given time t (where m could be between several and several thousand).

For example, the measurement signal 17 may indicate a certain boost pressure output in a turbocharged diesel engine and the actuator signal 16 may represent the position of the actuator vanes in the variable nozzle turbine (VNT) the actuator, turbocharged engine and sensor making up the nonlinear plant $G(\theta,s)$ 18. However, the amount of response in the boost pressure may be non-linear relative to the signal 17 over various magnitudes of signal 17. Or in addition the gain magnitude may vary with a revolution rate (rpm) of an output of the engine 18. A set of m linear sub-controllers may be designed, each appropriate for a range of engine speeds each having different gains or frequency responses relative to one another. For a given speed range, a certain controller with the desired gain may be selected by the switch 19 for the output 16. For another speed range, a different controller with another desired gain may be selected, and so on. The gain may be scheduled by selecting a controller from a group or bank of controllers according to the speed range of an operating engine 18. Each of the state observers 22, 23 (FIG. 2b) may have been in operation for sufficiently long time for its respective start up transient to have died out. For linear state observers, the start up transients have an exponentially fast decay rate. A key feature is that the state observers are each run from the true online control signal u(t) rather than the respective outputs of each sub-controller $v_1 \ldots v_m$ shown in 27, 28.

Figure 2B:
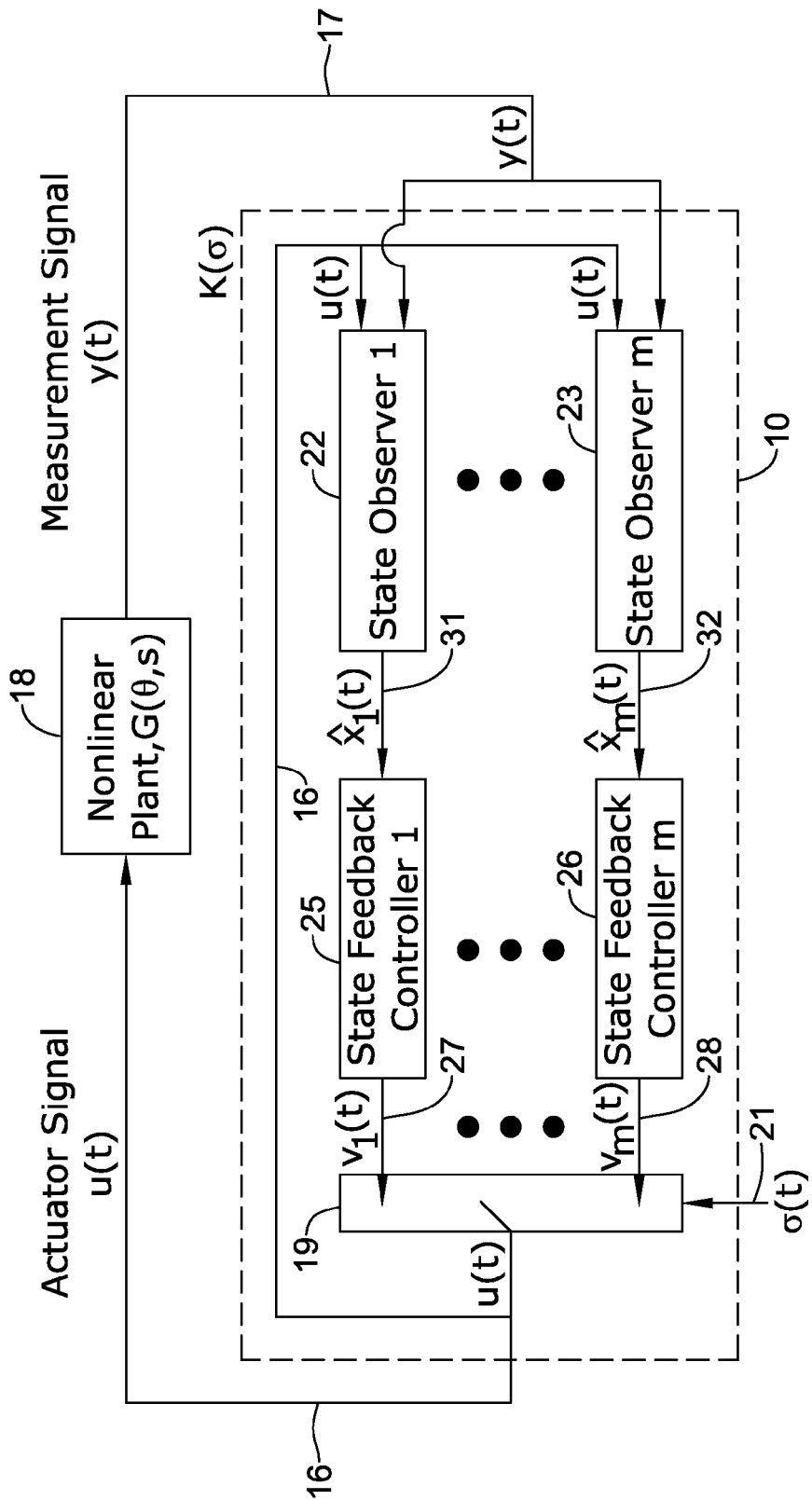

For the gain scheduled state feedback controller, the present system 10 of FIGS. 2a and 2b may include the use of a parallel bank of state observers 22, 23, with the goal of mitigating switching transients. These figures reveal a layout for switching between state feedback controllers 25, 26 where each of the m state observers 22, 23 may run simultaneously or in parallel with one another, that is, they are ready to go whenever selected or switched in. An online actuator signal u(t) 16 may be selected as one of the state feedback controller outputs $v_1(t) \ldots v_m(t)$, 27, 28. It should be evident that it may only be necessary to execute at most one of the m state feedback blocks 25, 26 at any given time. This may result in a decreased number of real-time required floating point operations which may be important in some computing environments such as embedded controllers. A measurement signal y(t) 17 may be input to the state observers (1 to m) 22, 23, of the present system 10. The number (m) of state observers and controllers, respectively, may vary from application to one kind of plant 18 to another. Such number may range between several and several thousand.

The state observers 1 (22) through m (23) may output estimated states $\hat{x}_1(t)$ through $\hat{x}_m(t)$ 31, 32, to state feedback controllers 1 (25) through m (26), respectively. The present system may have the benefit of mitigating switching transients by ensuring that an estimated state $\hat{x}_j(t)$ is ready and its initialization transients have completely or partially died out. The index "j" may be between 1 and m.

Figure 3:
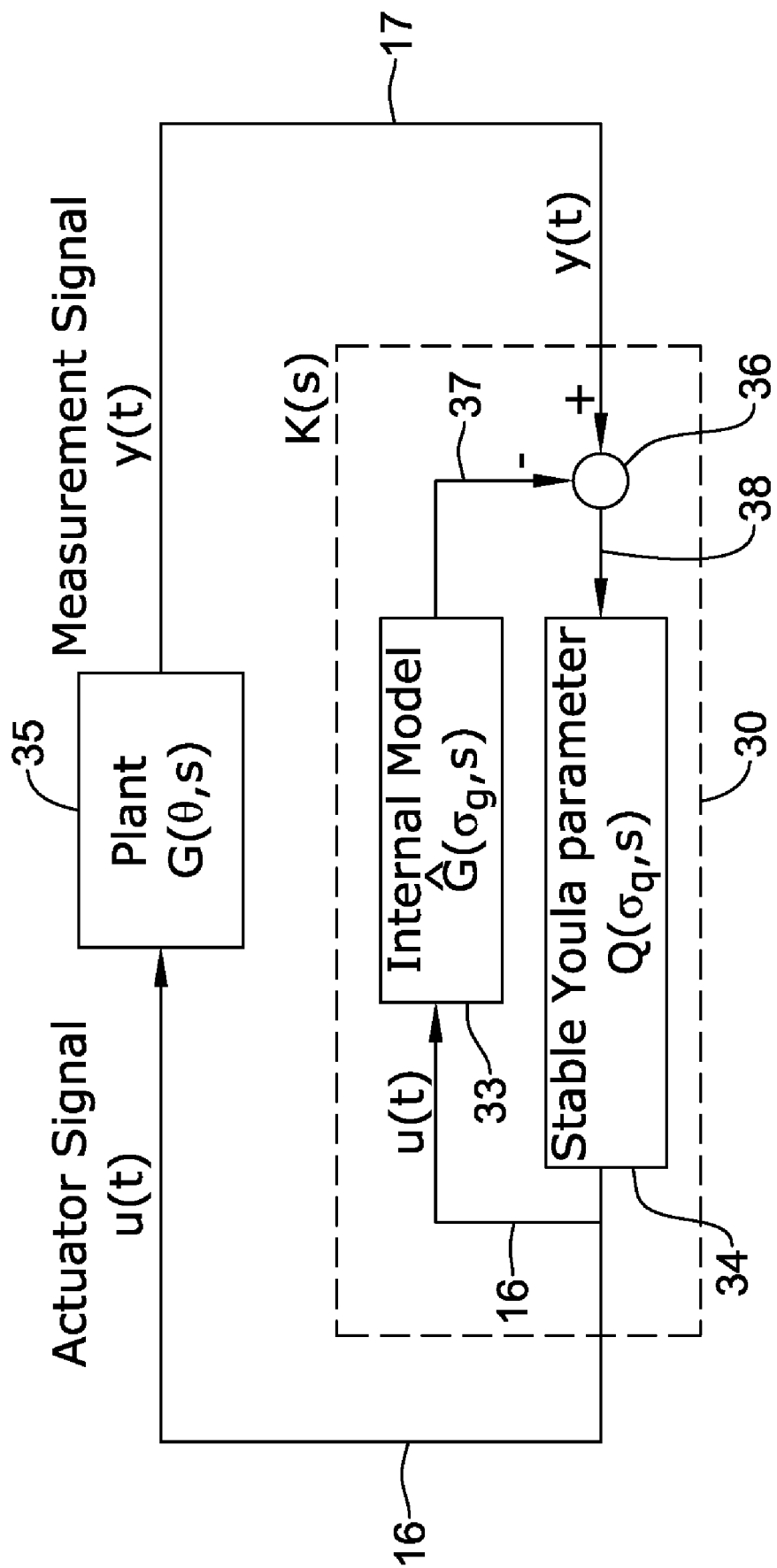
FIG. 3 shows an output feedback controller.

FIG. 3 reveals a diagram of a stabilizing linear output feedback controller K(s) 30 which may be factored into two components which include an internal model $\hat{G}(\sigma_g,s)$ module 33 of the plant G(θ,s) 35 dynamics, and a stable Youla parameter $Q(\sigma_q,s)$ module 34. Standard linear control theory indicates that aggressive control corresponds to a large value of the H∞ norm of the Youla parameter $\|Q(s)\|_{H\infty}$, while conservative control corresponds to a small value. A good internal model $\hat{G}(s)$ will result in a small value for the H∞ norm of its difference with the true plant denoted by $\|G(s)-\hat{G}(s)\|_{H\infty}$ while a poor internal model will not match the true plant G(s) very closely and result in a large norm of the difference. Robust stability to model uncertainty may be assured if:

$$\|G(s)-\hat{G}(s)\|_{H\infty}\|Q(s)\|_\infty < 1,$$

which shows a tradeoff between modeling and control. That is, aggressive control may only be achieved with good model information. A measurement signal y(t) 17 may go from the plant G 35 to an input of controller K(s) 30. The signal y(t) may go to a junction 36 (e.g., a summer) which subtracts a signal 37 from signal 17 to result in a signal 38 to the stable Youla parameter $Q(\sigma_q,s)$ module 34. Signal 37 may be from the internal model $\hat{G}(\sigma_g,s)$ module 33 which has an input of the actuator signal u(t) 16 that is an output of the stable Youla parameter Q(s) module 34.

To understand the problems involved with applying the straightforward output feedback control results for linear systems to nonlinear control of nonlinear systems, one may first consider the nonlinear plant G(θ,s), where y(t)=G(θ,s)u(t) is notational shorthand for a parameter-dependant state space system, $$\begin{bmatrix} \dot{x}(t) \\ y(t) \end{bmatrix} = \begin{bmatrix} A(\theta) & B(\theta) \\ C(\theta) & 0 \end{bmatrix} \begin{bmatrix} x(t) \\ u(t) \end{bmatrix} \quad (1)$$

where x(t) denotes the internal state of G(θ,s), and $\dot{x}(t)$ denotes the time derivative of x(t). Next, one may consider the general output feedback controller, $K(\sigma_k,s)$, where as above the expression $u(t)=K(\sigma_k,s)y(t)$ is notational shorthand for a parameter-dependant state space system, $$\begin{bmatrix} \dot{x}_k(t) \\ u(t) \end{bmatrix} = \begin{bmatrix} A_k(\sigma_k) & B_k(\sigma_k) \\ C_k(\sigma_k) & 0 \end{bmatrix} \begin{bmatrix} x_k(t) \\ y(t) \end{bmatrix} \quad (2)$$

where $x_k(t)$ denotes the internal state of the controller $K(\sigma_k,s)$.

Here, one may interpret a variable θ(t) in (1) to denote changes to the plant over which one has virtually no control. In contrast, the variable $\sigma_k(t)$ is used to denote scheduling or switching of the controller, which may be a design decision. The closed-loop may be created by (2) and (1) with $$X_{cl}^T = [x_g^T, x_k^T]$$

governed by $$\dot{X}_{cl} = A_{cl}(\theta, \sigma_k) X_{cl},$$

wherein $$A_{cl}(\theta, \sigma_k) = \begin{bmatrix} A(\theta) & B(\theta)C_k(\sigma_k) \\ B_k(\sigma_k)C(\theta) & A_k(\sigma_k) \end{bmatrix} \quad (3)$$

where the parameters {A(θ), B(θ), C(θ)} may be regarded as given properties of the plant (1) which are outside of the scope of influence of the designer. While the parameters of the controller $\{A_k(\sigma_k), B_k(\sigma_k), C_k(\sigma_k)\}$ are to be designed by a control engineer, it may be noted that the design of $\{A(\sigma_k), B(\sigma_k), C(\sigma_k)\}$ such that the closed-loop system denoted by (3) is stable, may be a difficult task. Due to this difficulty, it is usually addressed either through ad hoc gain scheduling techniques or through extremely advanced mathematics which require the use of specialized tools and impose limitations on the permissible controller structures. Both solutions appear incomplete since industrial applications require stability guarantees and often require the use of familiar sub-controller structures for example such as a PID or Smith predictor whose design and tuning may be well understood by industrial practitioners.

As a first step, one may note one aspect of the generalizing the Youla-plant parameterization illustrated for linear control systems in FIG. 3 to nonlinear control systems of the type discussed in equations (1), (2) herein. One may consider the following parameterization for the output feedback controller in (2), composed of two components, a nonlinear Youla-Kucera parameter denoted $Q(\sigma_q,s)$, where $u(t)=Q(\sigma_q,s)(y(t)-\hat{y}(t))$ is notational shorthand for the system as follows, $$\begin{bmatrix} \dot{x}_q(t) \\ u(t) \end{bmatrix} = \begin{bmatrix} A_q(\sigma_q) & B_q(\sigma_q) \\ C_q(\sigma_q) & 0 \end{bmatrix} \begin{bmatrix} x_q(t) \\ y(t) - \hat{y}(t) \end{bmatrix} \quad (4)$$

and an internal model denoted $\hat{G}(\sigma_g,s)$, where $\hat{y}(t)=\hat{G}(\sigma_g,s)u(t)$ is notational shorthand for the system as follows, $$\begin{bmatrix} \dot{x}_{\hat{g}}(t) \\ \hat{y}(t) \end{bmatrix} = \begin{bmatrix} \hat{A}(\sigma_g) & \hat{B}(\sigma_g) \\ \hat{C}(\sigma_g) & 0 \end{bmatrix} \begin{bmatrix} x_{\hat{g}}(t) \\ u(t) \end{bmatrix} \quad (5)$$

It may be noted that the closed-loop formed by interconnecting the nonlinear plan (1) with the partitioned controller in (4), (5) leads to an exponentially stable closed-loop in (3) for any exponentially stable parameter dependant Youla parameter $Q(\sigma_q,s)$ in (4) for the case where the internal model (5) matches perfectly the true plant in (1) (in other words $\{\hat{A}_g(\sigma_g),\hat{B}_g(\sigma_g),\hat{C}_g(\sigma_g)\}=\{A(\theta),B(\theta),C(\theta)\}$). Such a result may be known as a nominal stability (NS) result in the control engineering art.

The nominal stability of the closed-loop will hold for arbitrary $\{A_q(\sigma_q),B_q(\sigma_q)C_q(\sigma_q)\}$, the only restriction being the stability of $A_q(\sigma_q)$ for admissible $\sigma_q$. The designer may be free to design $\{A_q(\sigma_q),B_q(\sigma_q)C_q(\sigma_q)\}$ for other performance requirements, being comfortable that the design will result in a nominally exponentially stable closed-loop. The same cannot necessarily be said for design in terms of $\{A_k(\sigma_k),B_k(\sigma_k),C_k(\sigma_k)\}$ in (2). As seen in (3), the stability of the closed-loop may depend on $\{A_k(\sigma_k),B_k(\sigma_k),C_k(\sigma_k)\}$ in a complicated way and the analysis of its stability is currently an open problem in control engineering.

There may be robust $L_2$-stability with an uncertain plant. In any control system—linear or nonlinear—it is unrealistic to expect the controller's internal model $\hat{G}(\sigma_g,s)$ (5) to reflect the plant $G(\theta,s)$ in (1) perfectly. If the plant in (1) has bounded $L_2$-norm such that $\|G(\theta,s)\|_{L_2}<\gamma_g$, then the small gain theorem may lead to the following sufficient condition for $L_2$-stability of the closed-loop formed by (1), (4), (5), $$\|G(\theta)-\hat{G}(\sigma_g)\|_{L_2}\|Q(\sigma_q)\|_{L_2}<1 \quad (9)$$

The first term in (9) should be interpreted as the induced norm of the system that maps $u(t)$ to $y(t)$ where $y(t)=y_1(t)+y_2(t)$ with $y_1(t)=G(\theta,s)u(t)$ and $y_2(t)=\hat{G}(\sigma_g,s)u(t)$. The relation in (9), is analogous to the linear systems result, as it again explicitly illustrates the tradeoff between modeling and control on closed-loop stability. If the internal model $\hat{G}$ and scheduling logic $\sigma_g$ have been designed such that the first norm in (9) is small, then a control engineer could have increased freedom with which to design $Q(\sigma_q,s)$. Aggressive control may typically lead to larger induced norms $\|Q(\sigma_q,s)\|$.

Similar to the statement regarding exponential stability herein, if perfect model information is used in the internal model such that $\|G(\theta,s)-\hat{G}(\sigma_q,s)\|_{L_2}\to 0$ then (9) may show that any $Q(\sigma_q,s)$ in (4) with $\|Q(\sigma_q,s)\|<\infty$ results in an $L_2$-stabilizing controller $K(\sigma_g,\sigma_q,s)$. For the special case of linear systems $G(\theta,s)$, $\hat{G}(\sigma_g,s)$, $Q(\sigma_q,s)$, the result in (9) may be equivalent to the $H\infty$-norm robust stability result for additive unstructured model uncertainty with a standard definition of the Youla parameter, $$Q(s)=K(s)(I-G(s)K(s))^{-1}.$$

The controller structure in (4), (5) may lead to a globally stabilizing controller for a $L_2$-stable plant in (1). To see this, one may momentarily abandon all problem-specific insight and assume that the internal model in (5) has been designed to have $\|\hat{G}(\sigma_g,s)\|_{L_2}<\gamma_{\hat{g}}$, then one can create a globally $L_2$-stable closed-loop by selecting $\|Q(\sigma_q,s)\|<\gamma_q$ where $\gamma_q$ is small enough such that such that $$\gamma_q < \frac{1}{\gamma_q+\gamma_{\hat{q}}} \quad (10)$$

Thus, this design technique may achieve stability for any level of model uncertainty. The result in (10) may be noted in that it demonstrates the potential for designing globally stabilizing controllers (4), (5); however, it is likely to be very conservative as it may hold for arbitrary $\hat{G}$ and $Q$ with arbitrary switching signals $\sigma_g$ and $\sigma_q$. Indeed a good internal model should result in $$\|G(\theta,s)-\hat{G}(\sigma_g,s)\|_{L_2}<<\|G(\theta,s)\|_{L_2}+\|\hat{G}(\sigma_g,s)\|_{L_2}.$$

One approach of the invention may address several remaining practical issues in the design of a gain scheduled controller of the form in (4) and (5). First, one may never have perfect model information meaning that $\hat{G}(\theta_g,s)\neq G(\theta,s)$ in practice. Second, that selecting a parameter dependent matrix $A_q(\sigma_q)$ that is exponentially stable, while significantly easier than the full problem in (3), is still a non-trivial task. Third is to permit the control designer to select the structure of the sub-controllers (for example to be PID controllers or Smith predictor controllers). One approach of the invention may use a particular form for the nonlinear Youla parameter (4) and the internal model (5).

Figure 4:
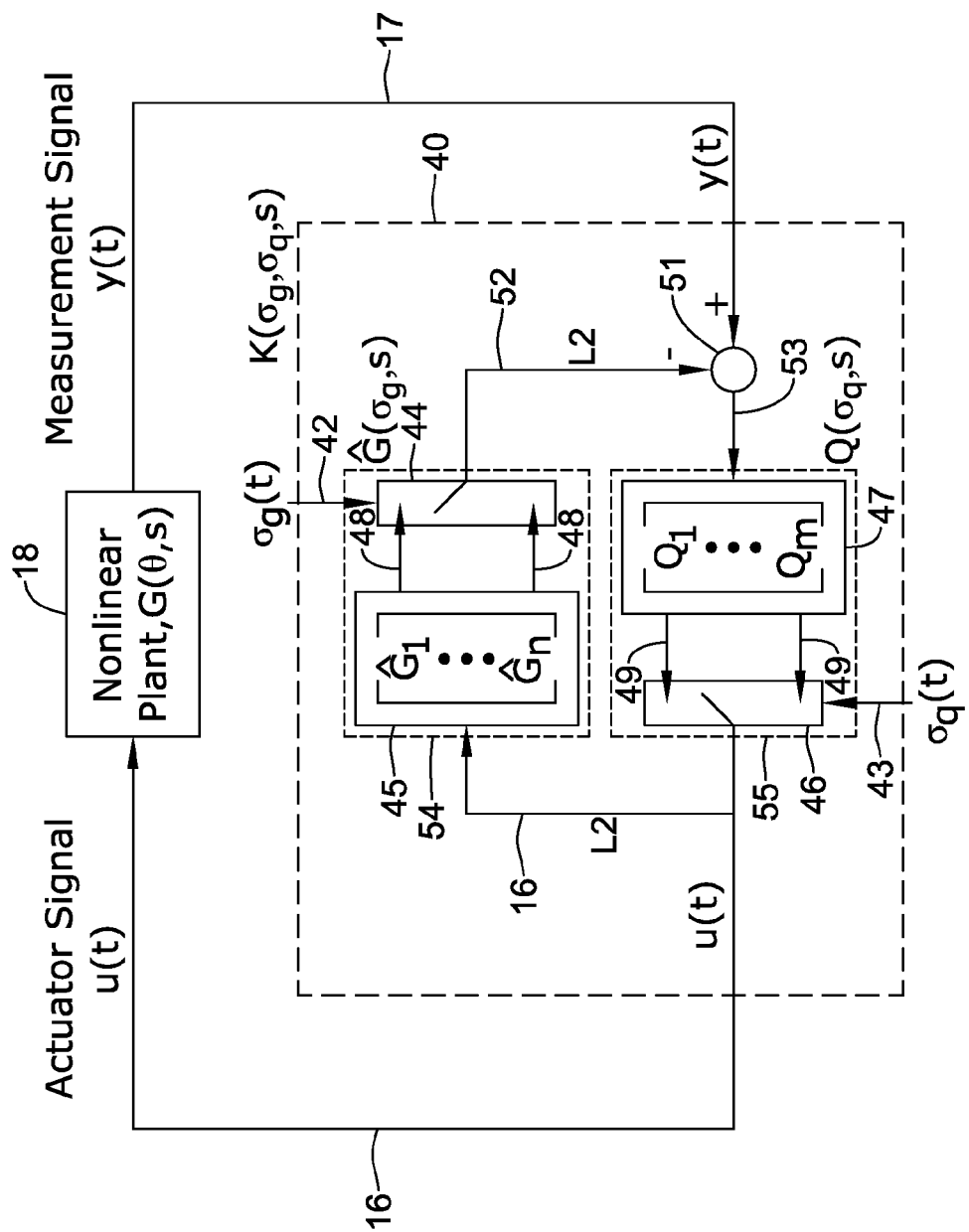
FIG. 4 shows a gain scheduled output feedback controller.

FIG. 4 shows a diagram of the controller configuration in (11), (12). One may consider a controller configuration with two main components. The internal model of the nonlinear plant, consisting of a bank of n linear plant models, $$\begin{bmatrix} w_1(s) \\ \vdots \\ w_n(s) \end{bmatrix} = \begin{bmatrix} \hat{G}_1(s) \\ \vdots \\ \hat{G}_n(s) \end{bmatrix} u(s), \quad (11)$$

$$u(t)=v_{\sigma_q}(t)$$

and a parallel bank of Youla-Kucera parameters, $$\begin{bmatrix} v_1(s) \\ \vdots \\ v_m(s) \end{bmatrix} = \begin{bmatrix} Q_1(s) \\ \vdots \\ Q_m(s) \end{bmatrix} l(s), \quad (12)$$

$$l(t)=y(t)-\hat{y}(t),$$

$$\hat{y}(t)=w_{\sigma_g}(t)$$

To illustrate their stability, one may write out a state-space version of $Q(\sigma_q,s)$ in (12). $Q(\sigma_q,s)$ may be realized in the state space by a form similar to (4), then the switched Youla parameter in (12) is given by $$Q(\sigma_q,s) \leftrightarrow \begin{bmatrix} A_q & B_q \\ C_q(\sigma_q) & 0 \end{bmatrix} \quad (13)$$

with the constant matrices $$A_q = diag\{A_1^q, \ldots, A_m^q\}, \quad (14)$$

$$B_q = \begin{bmatrix} B_1^q \\ \vdots \\ B_m^q \end{bmatrix}$$

are not a function of switching signal $\sigma_q$. The matrix $$C_q(j) = [0, \ldots, 0, C_j^q, 0, \ldots, 0] \quad (15)$$

may have zeros everywhere except for the $j^{th}$ block element. From the above representation, the switched $Q(\sigma_q, s)$ in (12) may be exponentially stable for arbitrary $\sigma_q$ if each LTI $Q_j(s)$ is stable for $j=1, \ldots, m$. The bank of internal models in (11) has a similar structure to that shown in (13)-(15).

One may note that due to its construction, the internal model component in (11) will not perfectly match the true plant in (1) except in very unusual circumstances. This may be partly a deliberate consequence of how one wants to design our controllers (a linear controller for a number of each operating point of the plant). But the particular configuration may permit a use the small gain condition of (9) to derive a sufficient result for closed-loop $L_2$ stability of the closed-loop in (1), (11), (12) as $$\|G(\theta,s) - \hat{G}(\sigma_g,s)\|_{L_2} \|Q(\sigma_q,s)\|_{L_2} < 1 \quad (16)$$

where the norm indicates the worst case induced $L_2$ norm evaluated over all input signals and all switching signals. The first term in (16) should be interpreted as the induced norm of the system that maps $u(t)$ to $y(t)$ where $y(t)=y_1(t)+Y_2(t)$ with $y_1(t)=G(\theta,s)u(t)$ and $y_2(t)=\hat{G}(\sigma_g,s)u(t)$.

It may be shown that the worst case induced $L_2$-norm of the bank of Youla parameters and the switch (denoted $Q(\sigma_q,s)$ in FIG. 4) in (12) is bounded by, $$\|Q(\sigma_q, s)\|_{L_2} \leq \gamma_q = \left\| \begin{bmatrix} Q_1(s) \\ \vdots \\ Q_m(s) \end{bmatrix} \right\|_{H_\infty} \quad (17)$$

for arbitrary switching signal $\sigma_q(t)$, the notation $\|\cdot\|_{H\infty}$ denotes the standard $H\infty$-norm of a linear system. An analogous upper bound may hold for the induced norm $\gamma_g$ of $\hat{G}(\sigma_g,s)$ in FIG. 4, $$\|\hat{G}(\sigma_g, s)\|_{L_2} \leq \gamma_g = \left\| \begin{bmatrix} \hat{G}_1(s) \\ \vdots \\ \hat{G}_n(s) \end{bmatrix} \right\|_{H_\infty} \quad (18)$$

for an arbitrary switching signal $\sigma_g(t)$. Then (17), (18) and (16) show that one may design a robustly stable closed-loop switched controller for an uncertain $L_2$ stable plant by designing a family of linear controllers.

If the open-loop plant in (1) is $L_2$ stable then an $L_2$ stable closed-loop may be achievable for (1), (11), (12) since the first induced norm in (16) is $\|G(\theta,s) - \hat{G}(\sigma_g,s)\|_{L_2} < \infty$ for arbitrary $\sigma_g$ and the second norm $\|Q(\sigma_q,s)\| < \infty$ for arbitrary $\sigma_q$ and may be selected by the designer. On the other hand, the appearance of (16) may make explicit the tradeoff between modeling and control in generating a stable gain scheduled controller. A good modeling result that produces a small value for the first induced norm may permit the designer to select a larger value for the second norm. Aggressive control may lead to large values for the Youla parameter. Conversely, a poor model (say with too few linearization points n) may lead to a large value for the first norm and the designer will be restricted to small values for the second norm which corresponds to conservative controllers.

The gain scheduled controller in (11), (12) may be an LTI controller $K_{ij}(s)=Q_j(s)(I-\hat{G}_i(s)Q_j(s))^{-1}$ for any fixed value of $\sigma_g=i$ and $\sigma_g=j$. The gain scheduled controller in (11), (12) may permit m≠n a different number of Youla parameters and plant parameters. Typically, a designer may require at least as many Youla parameters as linear plant models so that m≧n. One may envision the use of more Youla parameters than models for example to achieve a different closed-loop performance. For instance, controllers may use the structure (11), (12) for a special case of a single linear plant n=1 and multiple controller m>1. The controller in (11), (12) may experience jump discontinuities in the control signal u(t) at the switching times of $\sigma_q$. The configuration may be modified in a natural way to permit smoother transitions. For example, one may utilize a post-switch filter in some configurations. As discussed in U.S. patent application Ser. No. 11/444,850, filed Dec. 15, 2005, hereby incorporated by reference, such a post-switch filter may be designed such that it modifies the transient signals induced by switching.

Alternatively, (11), (12) may permit a natural interpolation between the controllers where various ad hoc techniques should not destabilize the closed-loop (1), (11), (12). The results in (16) may be obtained from the small gain theorem and any induced norm could be used. The $L_2$ norm may be used here for its connection with the $H\infty$ norm which is familiar in the robust control of linear systems.

Certain design steps noted herein may involve a gain scheduling design. The steps may include: 1) Linearize the nonlinear model about a family of n operating points parameterized by $\sigma_g$, generating models $\hat{G}_1(s), \ldots \hat{G}_n(s)$; 2) Design a family of linear controllers $K_1(s), \ldots, K_n(s)$ to achieve desired performance at each operating point; 3) Construct gain scheduled controller—at each operating point compute the corresponding Youla-Kucera parameter, $Q_p(s)=K_p(s)(I-\hat{G}_p(s)K_p(s))^{-1}$, and implement the controller using the factors $Q_p(s)$ and $\hat{G}_p(s)$ as in (11), (12); and 4) Analyze stability (16), (9) and performance. A significant step may be step 3 which is emphasized herein. These steps may describe a procedure one uses when designing a gain scheduled controller. The inventive step (3) is valuable over other approaches in that it (a) permits the designer to use intuitive, industrially familiar sub-controllers such as PID or Smith Predictor, (b) provides guarantees of closed-loop stability, and (c) does not require highly specialized mathematical tools to guarantee stability.

The diagram of FIG. 4 illustrates a present system aspect of a gain scheduled output feedback controller ($K(\sigma_g, \sigma_q, s)$) 40 (described in equations (1), (11), and (12)) as a nonlinear controller versus the linear controller 30. The gain scheduled output feedback controller system 40 may include a parallel bank 54 of internal models along with a parallel bank 55 of Youla parameters. A goal is to assure closed-loop stability and mitigate switching transients. In controller system 40, a measurement signal y(t) 17 may come from the nonlinear plant $G(\theta,s)$ 18 (e.g., an engine or other item or complex) and go to a junction 51 (e.g., a summer). A signal 52 from switch 44 may be subtracted from the signal 17 to result in a signal 53.

A signal 48 from one internal model of a parallel bank 45 of internal models 1 through n (where n could be between several and several thousand) may be selected as the signal 52 by a switch 44 in accordance with a switching signal $\sigma_g(t)$ 42 to switch 44. Bank 45 of internal models and the switch 44 may be a part of a switched internal model block $\hat{G}(\sigma_g,s)$ 54.

The resultant signal 53 from junction 51 may go to a parallel bank 47 of stable Youla parameters 1 through m (where m may be between several and several thousand). An actuator signal u(t) 16 may be selected from one of the parameter outputs 49 of bank 47 by a switch 46 in accordance with switching signal $\sigma_q(t)$ 43. The actuator signal 16 may be fed to the bank 45 of internal models. Bank 47 of stable Youla parameters and the switch 46 may be a part of a switched stable Youla parameter block $Q(\sigma_q,s)$ 55.

A switching signal $\sigma(t)$, resembling switching signal 21 of controller 10 (FIGS. 2a and 2b), may be partitioned as $\sigma(t)=[\sigma_g(t)\sigma_q(t)]$. Signal $\sigma_g(t)$ 42 may go to switch 44 and determine which one of the internal models, $G_1, \ldots, G_n$, of the parallel bank 45 is to be implemented or used at any given time to provide output signal 52. Signal $\sigma_q(t)$ 43 may go to switch 46 and determine which one of the signals 49 of the Youla parameters, $Q_1, \ldots, Q_m$, of parallel bank 47 is to be implemented or used at any given time to provide the output signal 16.

Closed-loop stability may be assured if the parallel bank 45 of internal models and the switching strategy in selection of their outputs effected by switch 44 are structured in such a way that a switched internal model block $\hat{G}(\sigma_g,s)$ 54 gives an output result 52 that is "close to" or resembles the nonlinear plant 18 as is made explicit in equation (16).

Further comment may be relative to a controller configuration is described herein for gain scheduling controllers for nonlinear plants. Global nominal and robust stability may be achieved. It may be regarded that there is no restriction on the order or structure or number of the individual linear sub-controllers.

Automotive systems may be used as a motivating example of LPV plants. However, it should be noted that typical scheduling variables include engine speed and fuel flow. The engine speed may be change according to some "slow" dynamics, but the fuel flow can be changed almost instantaneously. Thus, the assumption of $\rho_{min} \leq \dot{\theta}(t) \leq \rho_{max}$ used in many linear parameter varying (LPV) gain scheduled controller designs could not adequately be applied in many automotive systems. It is a strong advantage of the inventive technique that it does not place any restrictions on the rate of change of the scheduling variable $\theta(t)$.

A trade off between modeling and control may be made explicit in terms of induced norms on the closed-loop. It may be shown that better modeling might allow more aggressive control. Or, conversely, poor modeling of the nonlinear plant might necessarily compromise the closed-loop control performance.

It is shown that the question of closed-loop stability need not necessarily translate into a requirement that the scheduling variable change slowly. But instead closed-loop stability may depend on the quality of the internal model of the nonlinear plant. If this model is perfect, then there should be no closed-loop stability problems—regardless of the speed of change of the scheduling parameter $\theta(t)$.

Closed-loop exponential stability in the case of perfect model information may be demonstrated. As a limiting case, one may first consider the (unrealistic) situation where the control designer possesses perfect model information— which in this context will be defined as the internal model (5) matching the true plant (1) in an input-output sense. Here, one may define a perfect model implementation as the condition $\{\hat{A}_g(\sigma_g), \hat{B}_g(\sigma_g), \hat{C}_g(\sigma_g)\} = \{A(\theta), B(\theta), C(\theta)\}$ for all times $t \geq 0$. This condition may place requirements on both the realization of the internal model and also the design of the controller scheduling variable $\sigma_g$ which should allow the internal model (5) to perfectly track changes in the true scheduling parameter $\theta$ in (1). A counter-intuitive fact is that a requirement on the input-output behavior might impose requirements on the state space realization. To see how this may be true, one could consider a dynamical system that switches between $\{A_1, B_1, C_1\}$ and $\{A_2, B_2, C_2\}$. If one imposes a requirement of continuity on the output y (where $y(t) = C\sigma x(t)$) at switching times of $\sigma$ for any state x, then one would be obliged to select realizations for the linear subsystems such that $C_1 x = C_2 x$ for all $x \in R^n$.

If the internal model matches the plant, then (7) may be converted via a constant similarity transform to, $$S(A_{cl}(\theta, \sigma_g, \sigma_q)|_{\hat{G}=G})S^{-1} = \begin{bmatrix} A(\theta) & B(\theta)C_q(\sigma_q) & 0 \\ 0 & A_q(\sigma_q) & B_q(\sigma_q)C(\theta) \\ 0 & 0 & A(\theta) \end{bmatrix} \quad (8)$$

$$\text{Where } S = \begin{bmatrix} 0 & I & 0 \\ 0 & 0 & I \\ I & -I & 0 \end{bmatrix} \text{ in (8)}.$$

It may be easy to see from the block upper triangular structure of (8) that the exponential stability of the time varying $\dot{x} = A_{cl}(\theta, \sigma_g, \sigma_q)x$ is implied by the stability of $\dot{x} = A_q(\sigma_q)x$ for admissible $\sigma(t)$ and $\dot{x} = A_g(\theta)x$ for all admissible $\theta(t)$. For example, it may be sufficient (but not necessary) for closed-loop stability that a CQLF exists for all $A_q(\sigma_q)$ and another CQLF exists for $A_g(\theta)$. Thus, if $G(\theta,s)$ in (1) is exponentially stable for all admissible trajectories $\theta(t)$, and perfect model information is implemented in the internal model $\hat{G}(\sigma_g,s)$ in (5), then the closed-loop formed with (1), (4), (5) may be exponentially stable for any exponentially stable $Q(\sigma_q,s)$ in (4). The stability result may be verified where one starts at the bottom state of (8) and works upwards; the stability of each state may depend on the stability of the state succeeding it. It may be noted that this result is stated in terms of the quality of model information and implementation rather than the "slowly-varying" terms in gain scheduling or "dwell-time" results for switched systems.

The present controller system may have a bank of n state observers having a set of m state observers at a time running in parallel at nearly all times with m<=n and a bank of state feedback controllers corresponding to and connected to the bank of state observers. The set of m state observers which run in parallel may be a function of time and depend on a measurement signal (y)t 17. An output of each state feedback controller of the bank of state feedback controllers is selectable at nearly any time. State observers of the bank of state observers may run in parallel at nearly all times. The bank of state observers may have Kalman filters or extended Kalman filters.

Each state feedback controller of the bank of state feedback controllers may be designed using constrained LQR technology. The constrained LQR technology may be implemented as a set of look-up tables computed explicitly as a function of system states.

The present controller system may have a control loop with a bank of first dynamic filters, a bank of lookup tables connected to the bank of first dynamic filters, and a bank of second dynamic filters connected to a lookup table of the bank of look up tables. A second dynamic filter of the bank of second dynamic filters may be an identify filter.

The look up table or tables may be computed in various ways and/or provide various functions or actions, with some instances shown herein. A look up table may be computed with a multi-parametric hybrid algorithm. The lookup table may encode one or more constraints on one or more output parameters of a plant connected to the controller system. The look up table may be computed with a dynamic programming algorithm for constrained hybrid systems. The lookup table may accept one or more control constraints as inputs. The one or more control constraints may be time-varying.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A gain scheduled controller system comprising:
a plurality of controllers; and
a switch; and
wherein:
a terminal of the switch is selectively connectable to an output of nearly any controller of the plurality of controllers;
each controller of the plurality of controllers comprises gains;
the gains of the plurality of controllers are different;
the switch comprises an input for selectively connecting the terminal of the switch to the output of a controller of the plurality of controllers, having one of the gain;
a first input to the plurality of controllers is a measured parameter from an operational plant; and
a second input to the plurality of controllers is connected to the terminal of the switch;
the input to the switch depends in part on the measured parameter and an operating range of the plant, and in part by a factor other than the measured quantity and the operating range; and
the terminal of the switch is for providing an actuator signal to the plant.

2. A gain scheduled controller system comprising:
a plurality of state observers 1 to m, each having a measurement input y(t) from a mechanism, and a feedback input u(t);
a plurality of state feedback controllers 1 to m having inputs connected to outputs $\hat{x}_1(t)$ to $\hat{x}_m(t)$, respectively, of the state observers 1 to m; and
a switch having a first input selectively connectable to one of output $v_1(t)$ to $v_m(t)$ of the state feedback controllers 1 to m, respectively, and having an output u(t); and
wherein the output u(t) is the feedback input u(t) to the state observers 1 to m, and an actuator signal to the mechanism.

3. The system of claim 2, wherein the switch has a second input σ(t) for a signal that selects which one of the outputs $v_1(t)$ to $v_m(t)$ of the plurality of state feedback controllers 1 to m is to be connected to the first input of the switch.

4. The system of claim 3, wherein:
the mechanism is an operational plant; and
the output u(t) of the switch is an actuator signal for the plant; and
the second input signal σ(t) to the switch is for selecting, partially in accordance with an operational range of the plant, which one of the outputs $v_1(t)$ to $V_m(t)$ of the state feedback controllers 1 to m is to be connected to the first input of the switch.

5. The system of claim 4, wherein if the operational range of the plant changes, requiring a state feedback controller having a different gain, the first input of the switch connected to one of the outputs $v_1(t)$ to $v_m(t)$ of the state feedback controllers 1 to m, is changed to another output of the outputs $v_1(t)$ to $v_m(t)$ of the state feedback controllers 1 to m, respectively.

6. A gain scheduled controller system comprising:
a plurality of state observers 1 to m, each having a measurement input y(t) and a feedback input u(t);
a plurality of state feedback controllers 1 to m having inputs connected to output $\hat{x}_1(t)$ to $\hat{x}_m(t)$, respectively, of the state observers 1 to m; and
a switch having a first input selectively connectable to one of output $v_1(t)$ to $v_m(t)$ of the state feedback controllers 1 to m, respectively, and having an output u(t); and
wherein:
the output u(t) is the feedback input u(t) of the state observers 1 to m; and
the switch has a second input σ(t) for a signal that selects which one of the outputs $v_1(t)$ to $v_m(t)$ of the plurality of state feedback controllers 1 to m, respectively, is to be connected to the first input of the switch;
the measurement input y(t) is of a parameter of a mechanism; and
the output u(t) is an actuator signal to the mechanism for affecting the parameter.

7. The system of claim 6, wherein the outputs $\hat{x}_1(t)$ to $\hat{x}_m(t)$ of the state observers 1 to m are estimated states provided to the inputs of the state feedback controllers 1 to m, respectively.

8. The system of claim 7, wherein each state feedback controller of the state feedback controllers 1 to m is for generating an actuator signal as a function of an estimated state from each state observer, respectively, of the outputs $\hat{x}_1(t)$ to $\hat{x}_m(t)$ from the state observers 1 to m.

* * * * *